United States Patent [19]

Aono et al.

[11] Patent Number: 5,043,556
[45] Date of Patent: Aug. 27, 1991

[54] METHOD OF CUTTING A MATERIAL BY A LASER MACHINE

[75] Inventors: Kazuaki Aono; Yasuzi Yoshizumi; Katsumi Shiono; Akio Kishi, all of Ako, Japan

[73] Assignee: Mitsubishi Denki Kabushiki Kaisha, Tokyo, Japan

[21] Appl. No.: 462,570

[22] Filed: Jan. 8, 1990

[30] Foreign Application Priority Data

Jun. 20, 1989 [JP] Japan ................................. 1-158941

[51] Int. Cl.⁵ .............................................. B23K 26/00
[52] U.S. Cl. .......................... 219/121.72; 219/121.84
[58] Field of Search ...................... 219/121.67, 121.72, 219/121.6, 121.85, 121.84

[56] References Cited

U.S. PATENT DOCUMENTS 4,002,877 1/1977 Bangs .............................. 219/121.72

Primary Examiner—C. L. Albritton
Attorney, Agent, or Firm—Oblon, Spivak, McClelland, Maier & Neustadt

[57] ABSTRACT

A method of cutting a material which includes a first step of cutting a material by laser beams emitted from a laser machine, and a second, subsequent step of cleaning a surface of the material cut by the first step wherein water is used as a solvent. The second step of cleaning may be performed by ejecting a jet of water or by moving a material impregnated with water along the surface of the material cut in the first step. The material impregnated with water may be a cloth, sponge or paper.

5 Claims, 3 Drawing Sheets

METHOD OF CUTTING A MATERIAL BY A LASER MACHINE

FIELD OF THE INVENTION

The present invention relates to a method of cutting a material such as press board by a laser machine.

BACKGROUND OF THE INVENTION

FIG. 7 shows schematically a conventional method of cutting a material by using a laser machine. In FIG. 7, cutting of the material has been accomplished by controlling heat to a portion to be processed by adjusting a position of the focal point of laser beams, an output of the laser beams and a cutting speed depending on the material to be processed. In FIG. 7, reference numeral 1 designates a processing head, numeral 2 designates a focusing lens, numeral 3 designates laser beams, numeral 4 designates a focal point and numeral 5 designates a material to be cut.

When the material is to be cut, the focal point of the laser beams moves on the material along a predetermined path due to relative movement of the processing head with respect to the material to be cut 5, whereby the material is cut in a predetermined shape.

The above-mentioned laser beam processing is a method of cutting by utilizing heat. Accordingly, when insulating material made of paper or the like is to be cut, the phenomena that a cut surface becomes dark due to burning and a material at the cut surface is resinified or is chemically changed may cause deterioration in electrical performance, appearance and so on. The chemically changed material is very sensitive to an input heat at the focal point of the laser beams and locally appears due to a change of cutting speed at a curved portion and a change of focal point position which is caused by deformation of the cut material. This reduces the quality of products to be produced.

Besides the above-mentioned method utilizing heat which causes the problem of a chemical change, there has been proposed a method of cutting a material only by a water jet. However, when a material having a large thickness is to be cut, an extremely large propellent force is needed, which inevitably requires a large-sized apparatus and causes burrs or fuzzing at an edge of a cut portion in the cut material.

SUMMARY OF THE INVENTION

It is an object of the present invention to provide a method of cutting a material by a laser machine, which is capable of removing a chemically changed portion appearing at a localized portion of the material cut by the laser machine and improving the quality of the products.

The foregoing and other objects of the present invention have been attained by providing a method of cutting a material which comprises a first step of cutting a material by laser beams emitted from a laser machine, and a second step of cleaning with water a surface of the material cut at the first step.

It is more effective to use a water jet in the second step.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
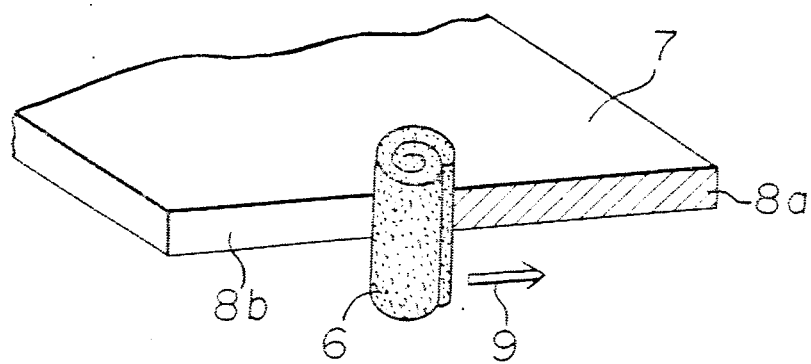
FIG. 1 is a diagram showing an embodiment of the second step in the method of cutting a material according to the present invention.

Preferred embodiments of the present invention will now be described with reference to the drawings. FIG. 1 shows in particular a second step of the method of the present invention, wherein reference numeral 6 designates a piece of sponge in rolled form, a numeral 7 designates press board made of paper which is cut by a laser machine, numeral 8a designates a cut surface of the press board which has not been wiped by sponge impregnated with water, numeral 8b designates a cut portion of the press board which has been wiped by the sponge, and numeral 9 designates an arrow mark which indicates a direction of wiping by the sponge impregnated with water.

The second step is very simple step wherein the end surface cut by a laser machine is wiped by the sponge 6 or cloth impregnated with water. The second step includes using water as a solvent to a substance adhered on the cut surface.

It is common knowledge that an organic solvent such as alcohol, acetone, or the like has been used as the solvent of this type. The inventors of this application conducted wiping and cleaning tests on end surfaces of samples cut by a laser machine wherein conditions such laser power, the speed of cutting and so on are changed. As a result, it was revealed that water can be effectively used rather than organic solvents in order to wipe and clean the end surface of press board cut by a laser machine.

Figure 2:
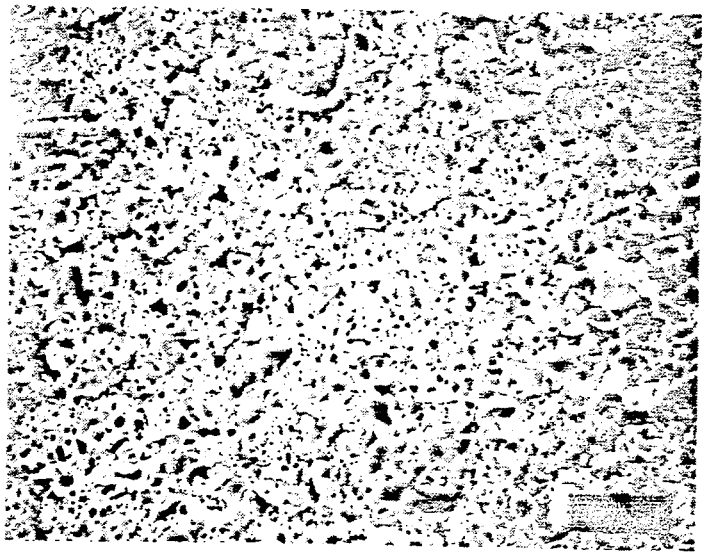
FIG. 2 is an electron micrograph of a cut portion without cleaning in cleaning tests.
Figure 3:
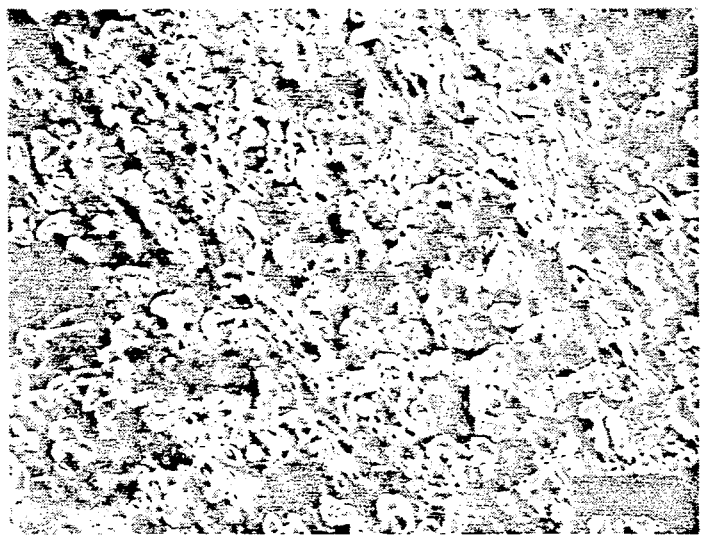
FIG. 3 is an electron micrograph of a cut portion cleaned by alcohol in cleaning tests.
Figure 4:
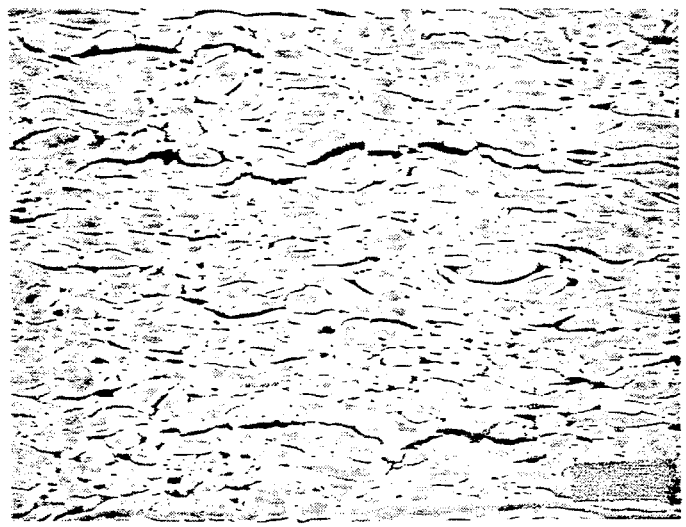
FIG. 4 is an electron micrograph of a cut portion cleaned by water in cleaning tests.

FIGS. 2 through 4 show electron micrographs showing the result of wiping and cleaning tests. Each sample shown in FIGS. 2–4 was cut under the same conditions, wherein the sample shown in FIG. 2 was not subjected to the wiping and cleaning operation, while the sample shown in FIG. 3 was subjected to wiping and cleaning operation with alcohol. In FIG. 3, some amount of an adhered material was removed from the cut surface, however, a large portion of the adhered material remained at the cut portion. FIG. 4 shows the state of cut portion which was wiped and cleaned by water and shows that fibers of the press board were entirely exposed. By comparing the electron micrograph, it is understood that water is very effective.

Thus, the second cleaning step using water as a solvent is an essential element of this invention. Accordingly, it goes without saying that the same effect can be obtained by using a material wettable with water such as cloth, paper or the like in order to supply water to a cut end surface besides of the sponge impregnated with water. Further, it is possible to suppress dust being the material impregnated with water from deposited on the cut surface by using a non dusting material of a sponge, cloth or paper which is usable for a clean room. Further, it is clear that the same effect can be obtained in the second step by using a wet brush.

It is preferable that water, used for cleaning the end surface of a cut material, to be clean, and more preferably foreign substances have to be removed by a filter before being used.

Figure 5:
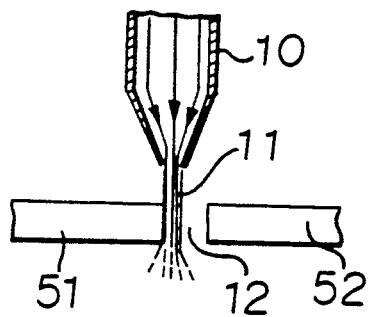
FIG. 5 is a diagram showing a second step of another embodiment of the present invention.

Another embodiment of the method of the present invention will be described with reference to FIG. 5. FIG. 5 shows a cleaning step wherein reference numeral 10 designates a nozzle for a water jet device, numeral 11 designates water ejected from the nozzle and numerals 51, 52 designate cut portions which have been separated by laser beams in the first step wherein the cut portion 51 is used for a final product. Numeral 12 designates a space produced by cutting the material by the laser beams.

The material adhered to the end surface of the cut portion is dissolved and peeled off by the water ejected from the water jet device, and the material can be easily removed from the end surface. Thus, the end surface is cleaned.

It is sufficient that only the surface of the cut portion cut by the laser beams is cleaned by the water jet, and it is unnecessary to generate a jetting force as large as that required to cut by only the water jet. The cut portion 52 as a waste material may be removed before the second step.

Figure 6:
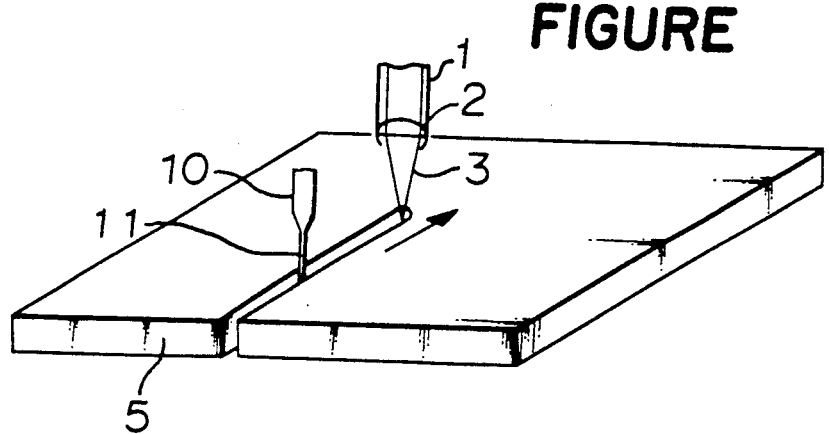
FIG. 6 is a diagram showing an application of the device as shown in FIG. 5.
Figure 7:
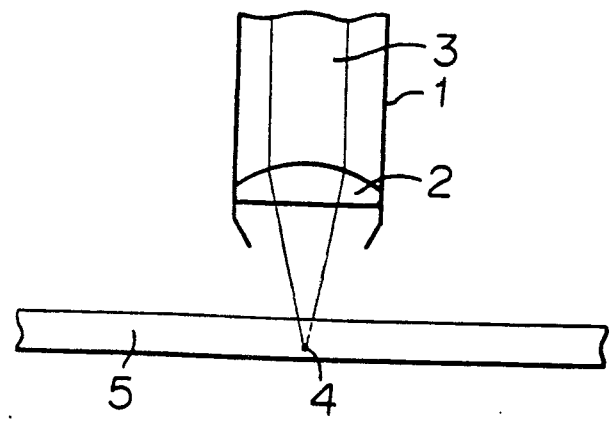
FIG. 7 is a diagram showing a conventional method of cutting a material by a laser machine.

In the second step, the cutting operation and the removing operation may be simultaneously performed by using a processing machine which is so controlled that the laser beams and the water jet draw the same locus as shown in FIG. 6, in order to reduce the time required for processing and improve the accuracy of water-jetting position in the second step.

A device for ejecting a liquid such as a solvent, oil the like may be used in the second step instead of the water jet device.

Further in the above-mentioned embodiments, press board is used for a material to be cut. However, the present invention is effective on material such as paper, wood or the like.

Thus, in accordance with the present invention which comprises a cutting step and an adhering material removing step such that the cut surface can be cleaned and products having a stable electric performance and good appearance can be obtained.

Especially, water is used for a solvent in the second step. Therefore, it is safe, economical and easy to use, and it has many advantages.

Further, the second step can be continuously performed after the first step by using the water jet. Furthermore, operating time can be shortened.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method of cutting a material which comprises:
   a first step of cutting a material at a point along a line by laser beams emitted from a laser machine, and
   a second, subsequent step of cleaning with water, at a point along said line spaced from the point of cutting, a localized end portion of the material cut and chemically changed by the first step.

2. The method of cutting a material according to claim 1, wherein the second step includes cleaning the cut surface of the material by ejecting a jet of water.

3. The method of cutting a material according to claim 1, wherein the material to be cut comprises press board.

4. The method of cutting a material according to claim 1, wherein said second step includes cleaning the cut surface of the material by moving a material impregnated with water along the cut surface.

5. The method of cutting a material according to claim 4, wherein the material impregnated with water is selected from the group consisting of cloth, sponge and paper.

* * * * *